United States Patent [19]

Kelly

[11] 4,076,514
[45] Feb. 28, 1978

[54] INSULATED TONGS FOR SUPPORTING GLASS SHEETS DURING PRESS BENDING TO V SHAPES AND PROCESS OF USE

[75] Inventor: Joseph B. Kelly, Crestline, Ohio

[73] Assignee: PPG Industries, Inc., Pittsburgh, Pa.

[21] Appl. No.: 756,211

[22] Filed: Jan. 3, 1977

[51] Int. Cl.² .......................................... C03B 23/02
[52] U.S. Cl. .................................... 65/106; 65/273; 65/289
[58] Field of Search ................. 65/103, 104, 106, 273, 65/275, 288, 289

[56] References Cited

U.S. PATENT DOCUMENTS

| | | | |
|---|---|---|---|
| 2,111,392 | 3/1938 | Galey | 52/632 |
| 2,176,999 | 10/1939 | Miller | 65/107 |
| 2,215,228 | 9/1940 | Oliver | 65/107 |
| 2,999,338 | 9/1961 | Richardson | 65/273 |
| 3,089,727 | 5/1963 | Hay | 294/118 |
| 3,248,195 | 4/1966 | Golightly et al. | 65/107 |
| 3,290,133 | 12/1966 | Thomas | 65/106 |
| 3,333,935 | 8/1967 | Valchar et al. | 65/106 |
| 3,340,039 | 9/1967 | Marceau | 65/348 |
| 3,363,930 | 1/1968 | Webb | 294/118 |
| 3,367,764 | 2/1968 | Seymour | 65/291 |
| 3,762,903 | 10/1973 | Hamilton | 65/107 |
| 3,762,904 | 10/1973 | Hamilton et al. | 65/107 |
| 3,795,501 | 3/1974 | Jansson et al. | 297/101 |
| 3,795,570 | 3/1974 | Jansson et al. | 428/34 |
| 3,847,586 | 11/1974 | Reese et al. | 65/290 |
| 3,854,920 | 12/1974 | Kay et al. | 65/106 |
| 3,865,680 | 2/1975 | Reese et al. | 428/174 |
| 3,879,184 | 4/1975 | Hamilton et al. | 65/107 |
| 3,960,535 | 6/1976 | Hamilton et al. | 65/104 |

FOREIGN PATENT DOCUMENTS

799,907   11/1968   Canada.

*Primary Examiner*—Arthur D. Kellogg
*Attorney, Agent, or Firm*—Dennis G. Millman; Edward I. Mates

[57] ABSTRACT

When glass sheets are bent to "V" shape by press bending and electrical current is used to provide localized heating along the intended line of a sharp bend, it is necessary to insulate the glass electrically from ground. This is done according to the present invention by providing the pressing molds that engage the glass with covers of electrical insulator material, such as fiber glass, and by incorporating in the glass suspending means or tongs a length of electrical insulator material sufficiently long to effectively insulate the metal tongs that engage the glass from the tong suspension carriage which is grounded and to avoid electrical arcing. The detailed tongs construction incorporating a member of an electrical insulator material of sufficient length to insulate the conductive glass sheet portion from a grounded tong supporting carriage and to avoid arcing therebetween is also part of the present invention.

6 Claims, 3 Drawing Figures

INSULATED TONGS FOR SUPPORTING GLASS SHEETS DURING PRESS BENDING TO V SHAPES AND PROCESS OF USE

BACKGROUND OF THE INVENTION

This invention relates to tongs that support glass sheets during a press bending operation, particularly one in which a heat softened glass sheet has a sharp bend imparted thereto by pressing between complementary molds immediately preceded by localized heating along the intended line of the sharp bend. Electric resistance heating provides the localized heat along the intended line of the sharp bend immediately prior to the pressing step.

Vertical press bending is well known in the art, as exemplified by U.S. Pat. No. 3,367,764 to S. L. Seymour. Prior art press bending processes, however, have been limited as to the sharpness of curvature which may be imparted to the glass. A minimum radius on the order of about 9 inches (23 centimeters) or more is typical of commercial press bending installations. It would be desirable to produce "V" bends having radii less than 8 inches, preferably on the order of 4 inches (10 centimeters) or less.

The production of sharp "V" bends has heretofore been most commonly carried out by gravity sag bending processes, wherein glass sheets are placed on contoured outline molds in a generally horizontal orientation and heated to the softening point of the glass so that the glass sags to conform to the shape of the mold. In order to cause such a bend to be concentrated along a line to form a "V" bend, localized heat is applied along that line by electric resistance heating through a wire or ribbon held close to or in contact with the glass or through an electroconductive substance applied to the glass. The use of a heated wire or ribbon is disclosed in U.S. Pat. No. 3,795,501 to R. A. Jansson and T. J. Reese; U.S. Pat. No. 3,795,570 to R. A. Jansson and D. L. Thomas; U.S. Pat. No. 3,847,586 to T. J. Reese, G. R. Claassen, and M. W. Tobin; U.S. Pat. No. 2,111,392 to J. H. Galey; U.S. Pat. No. 2,176,999 to R. A. Miller; U.S. Pat. No. 2,215,228 to J. G. Oliver; U.S. Pat. No. 3,248,195 to J. G. Golightly and H. E. McKelvey; and U.S. Pat. No. 2,999,338 to R. L. Richardson. The use of electroconductive stripes applied to the glass surfaces is disclosed in U.S. Pat. No. 3,762,903 to H. E. Hamilton; U.S. Pat. No. 3,762,904 to H. E. Hamilton, R. E. Bamford, and P. Pastorek; U.S. Pat. No. 3,879,184 to H. E. Hamilton and I. L. Soreghy; and U.S. Pat. No. 3,865,680 to T. J. Reese and H. S. Koontz.

Prior to this invention it has been proposed to apply localized heat to glass sheets in a press bending operation, but not in a manner compatible with forming "V" bends. One such proposal is disclosed in Canadian Patent No. 799,907 to R. E. Richardson where the leading edge of each glass sheet is heated in the press bending station in order to equalize the temperature of the sheets from their leading edge to their trailing edge. The heat is provided by radiant heaters aimed at the general region of the sheet near the leading edge. U.S. Pat. No. 3,333,935 to C. E. Valchar and S. J. Mrozinski shows a press bending method wherein the lower portion of each glass sheet is given additional heat by means of a pair of gas burners in order to enable that portion of the sheet to be bent to a sharper curvature. Such an arrangement, however, does not produce the narrow, precisely located lines of heating which are required for making "V" bends. Another use of localized heat during press bending is disclosed in U.S. Pat. No. 3,960,535 to H. E. Hamilton and W. W. Oelke, which discloses the application of heat with gas burners to the portion of glass sheets around holes in the sheets during press bending. The object is to maintain equalized temperature conditions in the glass, and therefore has very little in common with the production of "V" bends. U.S. Pat. No. 3,854,920 to Kay and Pickard shows a press bending mold with a plurality of elongated electrical heating elements extending along vertical lines in the mold, but the heating elements are beneath the surface of the mold since their purpose is to warm the entire mold face, not to impart localized heat to the glass.

In copending application Ser. No. 756,209 of Joseph B. Kelly and Kenneth A. Gibson filed Jan. 3, 1977, for forming "V" bends in glass sheets by press bending, a method and apparatus is disclosed that entails the application of a stripe of electroconductive material onto the surface of a glass sheet along a line corresponding to the intended location for a "V" bend. The sheet, with the strips in place, is heated as a whole to a temperature suitable for bending in the conventional manner by passing the sheet through a furnace. Upon leaving the furnace, the sheet is stopped between spaced, opposing, complementary press members, but before the press members engage the glass sheet, a pair of electrodes is moved into contact with the electroconductive stripe at opposite edges of the glass sheet so as to complete a circuit through the electroconductive stripe. A high voltage current is passed along the line defined by the stripe for a few seconds so as to heat the glass along the line to a temperature higher than that of the body of the glass. The electrodes are then withdrawn and the pressing commences immediately in the usual manner. The localized heating along the line of the "V" bend enables press bending to produce a radius of curvature well below 8 inches (20 centimeters).

Usually, glass sheets are suspended from metal tongs which, in turn, are connected to metal carriages that are provided with rails that ride on grounded rollers. Glass sheets are heated to a temperature at which the glass becomes electroconductive in order to be shaped by press bending. Therefore, the application of electrical energy along the line desired for sharp bending results in a leakage of electricity through the tongs and the tong supporting carriages to ground. Such leakage reduces the effectiveness of the voltage applied along the line desired for sharp bending and results in a bend of less sharpness than desired and an uncontrolled temperature pattern in the portion of the glass causing undesired added heating between the applied electroconductive line and the glass supporting tongs.

This additional heating causes all sorts of problems in the glass. The tongs indent into the glass to a greater extent than desired because the additional heat softens the glass in this region. Therefore, more severe localized distortion and marking of the glass results in the vicinity of the locations where the glass engaging elements of the tongs grip the glass than when no current is applied across the tong-gripped glass sheet.

U.S. Pat. No. 3,340,039 to Marceau discloses a glass sheet gripped by metal tongs which are connected by metal bars to metal carriages provided with metal wheels that ride along metal rails. This patent provides a resilient or shock-absorbing strip that is placed on the rails upon which the carriage wheels travel. The resilient strip is preferably rubber. While some rubber compositions do not conduct electricity, and apparatus disclosed in the Marceau patent may avoid the possibility of a direct grounding circuit from an electroconductive glass sheet through glass gripping tongs, connecting bars and carriage and wheels to a rail, the apparatus disclosed in this patent is such that if a high enough voltage were used to cause localized heating of the glass by electrical resistance, no provision is made to avoid electrical arcing between the wheels and track on which the wheels ride.

U.S. Pat. No. 3,363,930 to Webb discloses tongs having glass engaging elements composed of a fired ceramic composition having a high aluminum oxide content having a greater coefficient of friction with glass than stainless steel throughout the temperature range at which the glass is thermally processed to produce fabricated glass products. This patent also discloses several other embodiments of glass contacting elements composed of other ceramic materials having the requisite properties of greater hardness and higher tensile strength than pressed asbestos and substantially less thermal conductivity and a substantially lower thermal capacity than that of stainless steel. Some of these materials are inherently electrical insulator materials. However, the size of the glass contacting elements is relatively small so that if a high voltage were applied to an electroconductive glass sheet carried by tongs provided with the Webb glass engaging elements, arcing would not be avoided, even though there is a possibility that some of these materials listed on Webb would inherently have the electrical insulator properties whose characteristics were not appreciated prior to the present invention.

SUMMARY OF THE INVENTION

The present invention enables glass sheets to be bent sharply by press bending in conjunction with the application of electrical resistance heating along a line of sharp bending and providing means to insulate the glass engaging elements of the tongs from the grounded tong supporting carriage, thereby avoiding current flow that provides uncontrolled current flow and additional heating of the glass sheet in the vicinity of where it is gripped by tongs for press bending and locating the insulating means a sufficient distance from the electroconductive heating stripe and the grounded tong supporting carriage to avoid establishing a current flow that bypasses the current flow through the electroconductive heating stripe by arcing.

In a preferred embodiment of the present invention, a spacer means of electrical insulator material is included to space the tongs from the tong supporting elements, is of sufficient length to effectively insulate the metal tongs from the grounded tong supporting carriage and is located a sufficient distance from both the glass sheet and from the grounded tong supporting carriage to minimize the occurrence of arcing.

BRIEF DESCRIPTION OF THE DRAWINGS

In the drawings wherein like reference numbers refer to like structural elements and which form part of the description of the present invention.

DESCRIPTION OF THE PREFERRED EMBODIMENT

Figure 1:
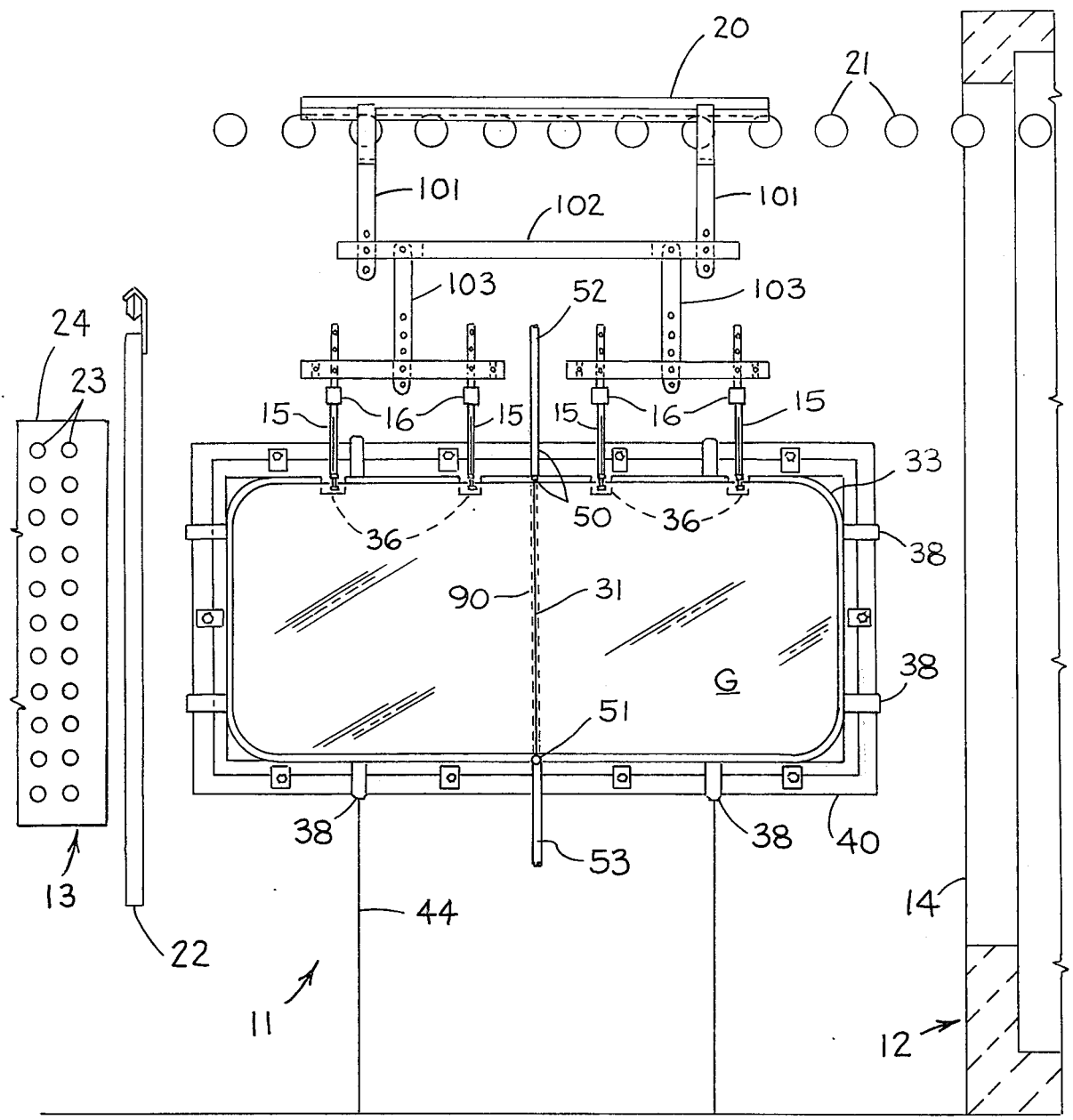
FIG. 1 is a vertical end view of a glass sheet supported in bending relation between a pair of press bending molds, wherein only one of the molds is shown, the glass being gripped by a plurality of tongs provided with spacers of electrical insulator material according to the teaching of the present invention.

FIG. 1 is a side view of a sheet of glass G which is one of a series of glass sheets that are individually transported from a furnace and is in position to be bent by engagement between a pair of opposing presses 10, only one of which is shown, at a shaping station 11. The shaping station 11 lies between the exit end of a furnace 12 and a cooling station 13. The furnace 12 is provided with a door 14 which slides open for each sheet of glass to pass from the furnace.

Each sheet of glass is suspended by several tongs 15 which are in turn hung from a carriage 20 which is propelled (from right to left in FIG. 1) along a conveyor comprising spaced, rotating conveyor rolls 21. As will be described in greater detail later, the carriage and conveyor are electrically insulated from the glass sheet and the glass supporting tongs 15 by means of an insulator block 16 for each tong 15.

A baffle 22 is at the entrance end of cooling station 13 to prevent tempering medium from blowing back into the shaping station. The baffle 22 may slide or pivot to permit each glass sheet to pass into the cooling station. The glass sheets are usually rapidly cooled in the cooling station so as to impart a temper to the glass. Cooling is effected by directing blasts of tempering medium, such as air, at the opposite major surfaces of the sheets from a large number of orifices 23 in a pair of opposed blast heads 24, all of which may take a variety of forms known in the art.

The press bending station shown in the drawings is a preferred arrangement as described in U.S. Pat. No. 3,367,764 to S. L. Seymour, the disclosure of which is hereby incorporated by reference. Since the presses themselves form no part of the present invention, only a brief outline of their construction and operation need be set forth here in order to understand the present invention. The shaping members of the opposed presses 10 are each comprised of a triple plate arrangement of a backplate, an adjusting plate, and a shaping plate 33 which is either a convexly curved shaping plate on one side or a complementary concavely curved shaping plate on the other side. The plates are adjustably fastened by a large number of threaded rods and nuts. By turning the nuts, the curvature on the face of the shaping member can be adjusted.

Each curved shaping plate 33 is provided with a series of notches 36 along the upper edge portion thereof. The notches on the shaping plate for press 10 are aligned with corresponding notches on the shaping plate for the opposite press. The position of each tong 15 is adjusted so that it is received in one or another of the aligned pairs of tong slots 36 when the presses 10 close against the opposite major surfaces of the glass sheet G to shape the latter.

The shaping plates 33 have a sharp line of bend 31 running vertically across the center. When the glass is being bent through a relatively large angle, it is sometimes preferred that the concave shaping member be provided with hinged segments so as to follow the glass as it bends. It may be advantageous in some instances to divide the concave shaping member into right and left hand sections hinged together to bend along an axis of rotation in a vertical plane that intersects the line of sharp bend. The glass-facing surfaces of both shaping plates 33 are covered with a material 37 which does not harm glass at elevated temperatures and is an electrical insulator material such as stretchable fiber glass cloth made of texturized yarns. The cover is held in place against the glass-facing surfaces by a number of clamps 38 secured to the margin of the adjusting plate or any other convenient structural member.

In the embodiment shown in the drawings, each shaping member is clamped onto a frame 40 carried on a housing, which reciprocates in an approximately horizontal direction relative to base 44. Shock absorber means and return spring means (not shown) limit the impact of the pressing action on the glass sheets. Each housing may be tilted by means of a pivot and a cylinder (not shown) of the type depicted in U.S. Pat. No. 3,290,133 to Thomas so as to reciprocate at an angle slightly off horizontal, which is sometimes found advantageous for reducing the pull of the tongs on the glass during pressing.

The sheet of glass G is shown in the drawings as stopped in alignment with the shaping members and with an upper electrode 50 and a lower electrode 51 in contact with opposite edges of the glass in preparation for the application of a localized line of heat between the electrodes. The electrodes are preferably made of tungsten carbide and may be "T" shaped, with a cross member of the "T" contacting an adjacent edge of the sheet and extending transversely to the edge of the sheet so as to render alignment less critical and to assure good electrical contact. Electrical leads 52 and 53 connect the electrodes with a source of high voltage electric current (not shown). It has been found that such an electrode arrangement also provides a secondary advantage by serving to steady the glass sheet immediately before the pressing operation. The electrical leads 52 and 53 are suitably insulated from ground as disclosed in copending U.S. patent application Ser. No. 756,209 of Joseph B. Kelly and Kenneth A. Gibson filed Jan. 3, 1977, the disclosure of which is incorporated herein by reference. The details of the electrode supports are not part of the present invention, so their detailed description is omitted for the purpose of avoiding obfuscation of the present invention.

Means is provided, as described in the aforesaid copending application of Kelly and Gibson, for moving the upper electrode into and out of contact with the upper edge portion of the glass sheet and additional means is provided to reciprocate the lower electrode into and out of contact with the lower edge portion of the glass sheet. Thus, after a line 90 of electroconductive material has been fused to the glass sheet surface during conveyance of the glass sheet through the furnace 10, and the electrodes moves into engagement with the opposite ends of the line 90 with the glass sheet G aligned between the presses 10 and voltage is applied between the electrodes 50 and 51, the upper electrode 50 is retracted by raising it above the level of the presses 10 and withdrawing it from between the tongs 15, and the lower electrode 51 is retracted out of the path taken by the presses 10 as the latter move toward the glass sheet G. With the electrodes out of the way, the presses are then moved toward one another and held in engagement against the opposite glass sheet surfaces to shape the glass, and after the presses are separated, the glass is conveyed out of the shaping station 11 and into the cooling station 14. When the next sheet of glass is conveyed into the shaping station and stopped, the reverse motion is imparted to the electrodes, whereby the upper electrode 50 moves between adjacent tongs 15 into contact with the top edge of the glass sheet G and the lower electrode 51 moves into contact with the bottom edge of the glass sheet.

The extending and retracting of both upper and lower electrodes are carried out in unison, preferably by automatic control means responsive to the location of the glass sheet. The simultaneous engagement of the electrodes 50 and 51 against the upper and lower edges of the glass sheet G steadies the position of the latter and minimizes swaying. Thus, when the electrodes 50 and 51 retract from contact with the glass and the presses 10 engage the glass sheet, each pair of corresponding notches 36 becomes aligned with a corresponding tong 15, thus avoiding damage to the tongs and minimizing damage to the glass in the vicinity of the tong gripping areas.

As shown in FIG. 1, the glass sheet has a stripe 90 of electroconductive material applied to one surface of the sheet along the line 31 of the intended sharp bend. The stripe may extend onto the top and bottom edge surfaces of the sheet so that the "T" shaped electrodes may make good electrical contact with the stripe. Other possible electrode configurations may not require that the stripe extend onto the edges of the glass sheets. Electroconductive materials suitable for the stripe include silver frits of the type disclosed in U.S. Pat. Nos. 3,762,903; 3,762,904; 3,879,184; and 3,865,680; and graphite. Either may be applied onto the glass in liquid or paste form by brushing, rolling, or extruding. A dispersion of colloidal graphite in water found particularly suitable for use as the stripe material is sold under the name DAG 137 by Acheson Colloids Company.

When electric current is passed through the stripe, its high resistance generates heat in the stripe which is imparted to the underlying glass. As the temperature of the glass increases, its electrical conductivity increases to a level where the glass itself becomes the main conductor of the current so that heat is generated within the glass itself. When the heating stripe 90 is a silver ceramic frit, the heating process improves the fusion of the silver frit to the glass which, when it has been applied to the glass sheet before its conveyance through the furnace 12, has begun to fuse to the applied surface, thereby making it a permanent part of the glass sheet. Graphite, on the other hand, is oxidized during the heating to an easily removed deposit on the surface of the glass, although at higher power levels, graphite is sometimes completely removed. Width of the stripe will vary in accordance with its resistance requirement and the sharpness of the bend being made, but as an example, graphite stripes about ⅛ inch (3 millimeters) to 3/16 inch (5 millimeters) wide have been successfully used to produce "V" bends of 20° to 30° within a ⅜ inch (9.5 millimeters) wide portion of the glass.

The resistance of the stripe, the voltage and amperage applied to the stripe, and the amount of time available for heating the stripe are all interdependent variables, each of which may have a rather wide range of feasibility. The basic requirement is that, within the time available, sufficient thermal energy must be imparted to the hot line to appreciably lower the viscosity of the glass along that line below the viscosity of the body of the glass sheet.

For example, in one press bending operation of the type shown in the drawings, the glass usually leaves the furnace at a temperature of about 1160° F (627° C.) to about 1250° F. (677° C.). When producing "V" bends, the surface temperature along the line 90 was observed to typically reach an estimated minimum of 1500° F. (816° C.) and possibly as high as 2200° F. (1204° C.), an increase of at least 250° F. (139° C.).

The chief process constraint will usually be the amount of time available for applying the hot line. Since the glass begins losing heat as soon as it leaves the furnace, it must be bent and tempered without delay before the glass temperature drops below critical levels. Therefore, only a few seconds can usually be spared for the additional step of applying the hot line, and part of that time must be consumed by bringing the electrodes into position of alignment for application of the voltage across the glass sheet and withdrawing the electrodes to permit the presses to close.

The time available will vary from one installation to another, depending largely upon the speed of the glass conveyor and the thickness of the glass (thinner sheets must be processed more rapidly). As an example, in the installation referred to above, a 5 second delay in the pressing sequence (2 seconds for the electrodes to engage the glass, 3 seconds for heating) was sufficient for producing hot lines without detracting from the quality of the temper subsequently imparted to 7/32 inch (5.6 millimeters) thick glass sheets. Normally, excessive power levels would be required to accomplish the hot line heating in much less than 2 seconds, and seldom would more than 10 seconds be available if the glass is to be tempered.

The resistance of the stripe and the voltage and amperage of the current applied to the stripe must be selected so as to provide enough power to produce the desired temperature rise within the available time. High resistances are preferred for the stripe, but the resistance must, of course, be less than that of the glass itself and it should not be so high as to require hazardously large voltages. For a typical stripe length on the order of about 20 inches (50 centimeters), the resistance may most conveniently lie in the range of about 5,000 ohms to 30,000 ohms (measured at room temperature). The voltage in such a case may be about 2,000 to 13,000 volts A.C., but higher voltages may be used if the electrodes are spaced far enough from nearby conductive structures to prevent arcing. In the 2,000 to 13,000 volt range, an air gap of about 7 inches (18 centimeters) around the electrodes should provide an adequate margin of safety. The corresponding amperage may be, for example, about 0.5 to 2.5 amps.

The following two examples illustrate typical conditions under which "V" bends having radii of about 4 inches (10 centimeters) may be made by vertical press bending.

|  | Example 1 | Example 2 |
|---|---|---|
| Glass thickness: | 7/32 inch<br>(5.6 millimeters) | 7/32 inch<br>(5.6 millimeters) |
| Stripe length<br>(graphite): | 19 inches<br>(48 centimeters) | 19 inches<br>(48 centimeters) |
| Voltage: | 3,000 volts A.C. | 12,500 volts A.C. |
| Amperage: | 1.75 amps | 1.6 amps |
| Heating Time: | 3 seconds | 3 seconds |
| Power: | 4.37 kilowatt-hours | 17.0 kilowatt-hours |

The stripe may be applied to either side of the glass. When on the concave side of the bend, a ridge is formed in the bent glass along the line of bend; when on the convex side, a slight depression along the line of bend is produced. In either case, it appears that the glass near the surface which is in direct contact with the stripe becomes considerably hotter than the glass near the opposite surface along the line. As a result, a hinge-like effect is obtained since one side of the hot line remains more viscous than the other side, an effect which is advantageous in that it prevents stretching and tearing of the glass sheet along the hot line.

According to prior art techniques for shaping and tempering referred to earlier, glass sheets are suspended from metal tongs which, in turn, are connected by metal connectors to metal carriages that are provided with metal rails that ride on grounded rollers. The glass sheets are heated to a temperature at which the glass becomes electroconductive in order to be shaped by press bending. Therefore, the application of electrical energy along the line desired for sharp bending results in a leakage of electricity through the tongs, the tong connectors and the tong supporting carriages to ground. Such leakage reduces the effectiveness of the voltage applied along the line desired for sharp bending and results in a bend of less sharpness than desired and an uncontrolled temperature pattern in the portion of the glass causing undesired added heating between the applied electroconductive line and the glass supporting tongs.

This additional heating causes all sorts of problems in the glass. The tongs indent into the glass to a greater extent than desired because the additional heat softens the glass in this region. Therefore, more severe localized distortion and marking of the glass results in the vicinity of the locations where the glass engaging elements of the tongs grip the glass than when no current is applied across the tong-gripped glass sheet.

While some prior art apparatus use rubber compositions that do not conduct electricity to provide a resilient or shock absorbing strip for rails on which metal wheels of metal tong supporting carriages ride, the inherent electrical insulator characteristic of these compositions may avoid the possibility of a direct grounding circuit from an electroconductive glass sheet through glass gripping tongs, connecting bars and carriage and wheels to a grounded track, if a high enough voltage were used to cause localized heating of the glass by electrical resistance along a line desired for sharp bending, no provision is made in such prior art apparatus to avoid electrical arcing between the wheels and the grounded track on which the wheels ride.

The prior art has also used tongs having glass engaging elements composed of a fired ceramic composition having a high aluminum oxide content having a greater coefficient of friction with glass than stainless steel throughout the temperature range at which glass is thermally processed to produce fabricated glass products. The prior art also discloses several other embodiments of glass contacting elements composed of other ceramic materials having the requisite properties of greater hardness and higher tensile strength than pressed asbestos and substantially less thermal conductivity and a substantially lower thermal capacity than that of stainless steel. Some of these materials are inherently electrical insulator materials. However, the glass contacting elements of such tongs are relatively small in size so that if a high voltage were applied to an electroconductive stripe along a surface of an electroconductive glass sheet carried by tongs provided with the glass engaging elements of non-electroconductive material, arcing would not be avoided, even though there is a possibility that some of these materials would inherently have the electrical insulator properties whose characteristics were not appreciated prior to the present invention.

In a preferred embodiment of the present invention, a spacer means of electrical insulator material in the form of an insulator block 16 is included to space the tongs from the tong supporting elements, is of sufficient length to effectively insulate the metal tongs from the grounded tong supporting carriage and is located a sufficient distance from both the glass sheet and from the grounded tong supporting carriage to minimize the occurrence of arcing.

Figure 2:
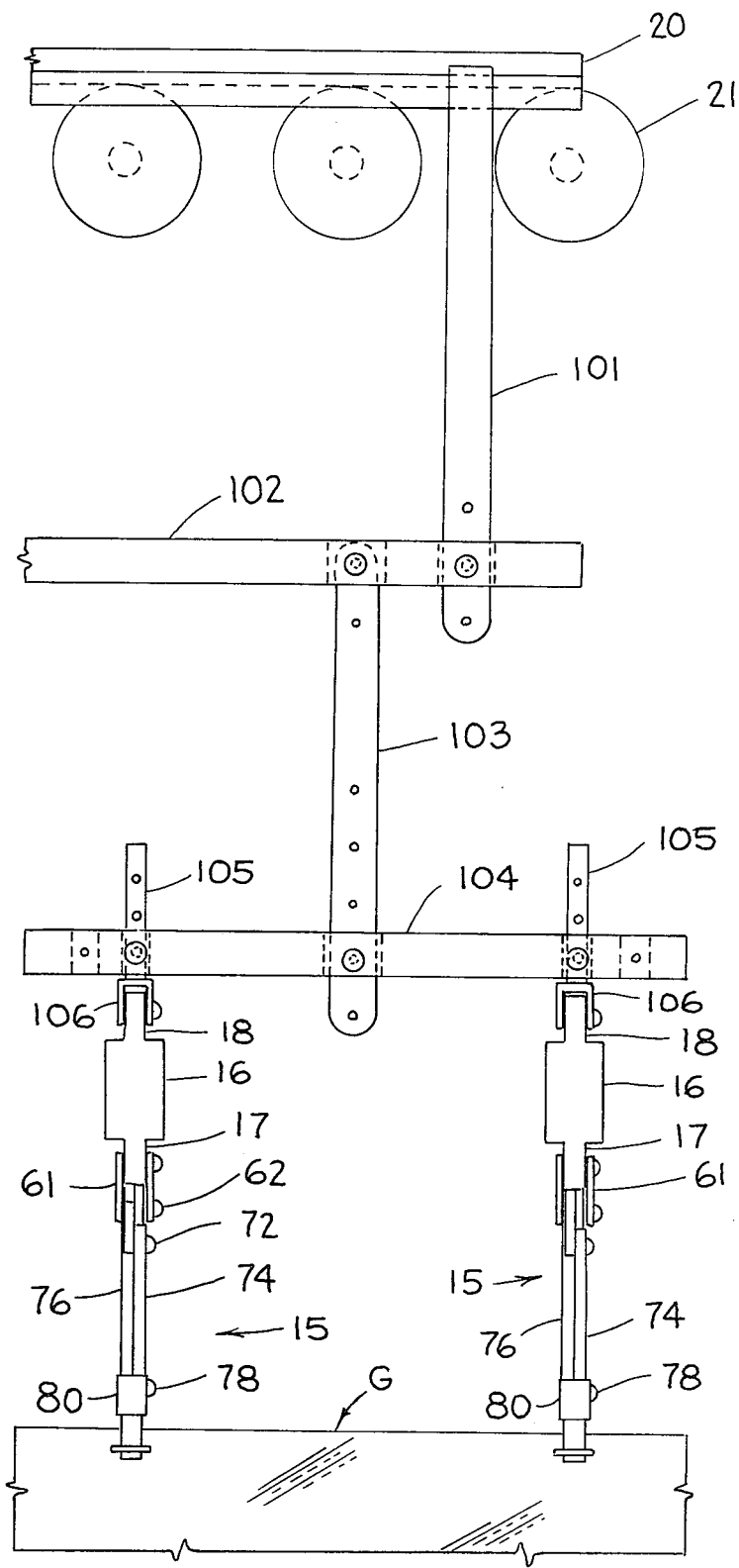
FIG. 2 is an enlarged, fragmentary view of a portion of FIG. 1 showing part of the glass supporting structure including the specially constructed tongs of the present invention.
Figure 3:
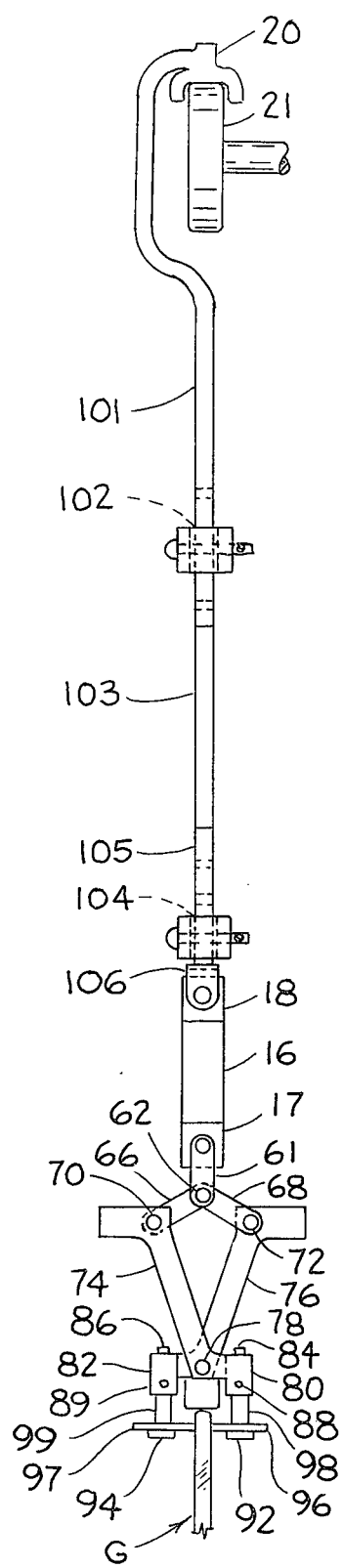
FIG. 3 is a fragmentary end view taken at right angles to the fragmentary view of FIG. 2.

Referring to the drawings, FIGS. 1 to 3 show one embodiment of self-closing tongs improved by the present invention. In this embodiment, an apertured clevis 61 is pivotally supported at its upper apertured end to a lower portion 17 of reduced thickness of insulator block 16. At its lower end, the apertured clevis 61 supports a tong support pin 62 through its lower aperture. Upper tong links 66 and 68 are pivoted to tong support pin 12 at their upper ends. At the lower ends, links 66 and 68 carry one of a pair of link pins 70 and 72. A pair of lower tong arms 74 and 76 are apertured at their upper portions to receive one or the other of the link pins 70 and 72. Link pin 70 pivotally attaches the upper portion of tong arm 74 to the lower portion of link 66 whereas link pin 72 pivotally secures the lower portion of link 68 to the upper portion of tong arm 76. A common hinge pin 78 secures tong arms 74 and 76 to one another near their lower portion.

Beyond the common hinge pin 78, tong arm 74 forms an apertured extension 80 and tong arm 76 forms an apertured extension 82. A rod 84 extends through a vertical aperture in apertured extension 80 and a similar rod 86 extends likewise through a vertical aperture in apertured extension 82. Each rod has a diametrically extending hole that matches with cross-holes extending generally horizontally through the apertured extensions 80 and 82. This permits cotter pins 88 and 89 to secure the rods 84 and 86 to the respective extensions 80 and 82.

The lower end of rod 84 has an enlarged head 92 and the lower end of rod 86 has an enlarged head 94. A disc 96 is rotatably mounted in concentric relation around rod 84 and makes bearing contact with the upper surface of head 92. Another disc 97 is similarly mounted around rod 86 to make bearing contact with the upper surface of head 94. Sleeves 98 and 99 are rotatably mounted above discs 96 and 97, respectively, about rods 84 and 86. The sleeves may be provided with outward extending flanges at their bottom ends.

Discs 96 and 97 have larger diameters than the flanges on the sleeves 98 and 99 and the heads 92 and 94. Thus, their peripheral edges, which are of appreciable axial extent (for example, about ⅛ inch or about 3 millimeters thick), make free rotating contact with the opposite major surfaces of a glass sheet G that is gripped between said discs in pressurized engagement. The tongs structure depicted in FIGS. 1 to 3 is similar to that of the prior art as exemplified by U.S. Pat. No. 3,089,727 to William J. Hay except for the fact that the prior art tongs were made of stainless steel including the glass engaging elements or discs 96 and 97, the tong supporting carriages 20 and the means connecting the tongs 15 to the carriages 20. The remainder of the tongs other than the insulator blocks 16 is unchanged from the prior art tongs and composed of stainless steel.

The means connecting the tongs 15 to the grounded tong-supporting carriage 20, which was all metal in the prior art, comprises a metal hook member 101 connected at its upper end to the carriage 20 and has an apertured bottom portion secured to a horizontal bar 102 of the connecting means. A pair of apertured vertical bars 103 are connected at their upper ends to horizontal bar 102 and at their lower ends to one of a pair of pivotable bars 104, which are pivotally connected to the bottom portion of one or the other of the apertured vertical bars 103. Each pivotable bar 104 is apertured to receive a vertically extending, apertured, clevis-supporting rod 105 on either side of its pivotal connection to the bottom portion of one or the other vertical bar 103. A clevis 106 is fixed to the lower end of the clevis-supporting rod 105. The insulator block 16 has an upper end portion 18 of reduced thickness that is pivotally connected to the clevis 106.

The dimensions of the elements 101 through 106 are such that the electrical insulator block 16 is spaced sufficient distance from the grounded connection between the carriage 20 and the conveyor rolls 21, the length of the electrical insulator block 16 that separates the clevis 106 that is electrically connected to ground from the clevis 61 that is electrically connected to the glass engaging elements or tong discs 96 and 97, and the length of the structural elements of the tongs 15 and of the clevis 61 are such that the possibility of arcing between the electroconductive glass sheet exposed to a high voltage and the grounded carriage to bypass the connecting means comprising elements 101 to 106 is slight thanks to the presence of the electrical insulator block 16 in the connecting means.

In a typical apparatus used to perform the glass sheet shaping and tempering operation previously described, the total length of the electrical path from the glass engaging discs 96 and 97 to the upper end of the clevis 61 was 6 inches (15 centimeters), the distance of the insulator block 16 separating the top end of clevis 61 from the bottom edge of clevis 106 was 2.5 inches (6 centimeters) and the length of the electrical path from the bottom edge of the clevis 106 to the grounded carriage 20 exceeded 6 inches (15 centimeters). Using this apparatus, no arcing was observed in operating the apparatus under conditions described for Examples 1 and 2 described previously.

The length of the insulator block may vary depending upon the voltage impressed along the electroconductive line applied to induce the line of sharp bending. A minimum length of 1 inch (2.5 centimeters) is preferred to avoid arcing and to avoid a continuous current path from the stripe of electroconductive material, through the electroconductive glass, through the metal tongs, and through the means connecting the tongs to the grounded tong supporting carriage. There is no upper limit to the length of the insulator block. However, as a practical matter, the maximum size of the block should be selected with a view to minimize the mass thereof, which mass determines the heat capacity of the insulator block. It is advisable to minimize the mass of the structural elements used to convey the glass sheets to be treated.

It should be understood that variations and modifications of the preferred embodiment of the present invention described herein as are known to those in the art may be made without departing from the spirit and scope of the invention as defined by the claimed subject matter that follows.

I claim:

1. In a method of shaping a glass sheet to a sharp radius of bending by heating said glass sheet to a temperature at which glass is electroconductive and press bending said sheet in conjunction with applying electric current along a stripe of electroconductive material applied to said sheet along a line of sharp bending while supporting said glass sheet by glass engaging elements of metal tongs of electroconductive material supported by and connected to a grounded tong supporting carriage of electroconductive material, the improvement comprising insulating the glass engaging elements of the tongs from the grounded tong supporting carriage, thereby avoiding uncontrolled current flow from said stripe through said electroconductive glass, said tongs and said carriage to ground by providing electrical insulator means between said tongs and the grounded tong supporting carriage of sufficient length to effectively insulate the metal tongs from the grounded tong supporting carriage and located a sufficient distance from both said glass sheet and from said grounded tong supporting carriage to minimize the occurrence of arcing and to avoid establishing a continuous electrical current flow to the grounded carriage from the stripe through the electroconductive glass, the tongs and said tong supporting carriage that reduces to a significant extent the electric current flow along the electroconductive heating stripe.

2. The improvement as in claim 1, wherein said electrical insulator means provided between said tongs and said grounded tong supporting carriage is applied in such a manner as to interrupt the continuous circuit connection for a length of at least 1 inch (2.5 centimeters).

3. The improvement as in claim 2, wherein said electrical insulator means is applied in such a manner as to interrupt the continuous circuit connection for a length of at least 6 centimeters.

4. Apparatus for shaping a glass sheet to a sharp radius of bending, comprising: a furnace having means for heating a sheet of glass to a softened condition suitable for bending, a pair of opposed bending molds adjacent to said furnace adapted to press bend heat-softened glass sheets suspended between the molds, grounded carriage means for conveying glass sheets from said furnace and for supporting glass sheets in a bending location between said bending molds, electroconductive tong means carried by said carriage means for gripping edge portions of glass sheets to retain the glass sheets on said carriage means, electrode means at said bending location adapted to contact edge portions of the glass sheets for applying electrical current across the glass sheets along a line of sharp radius bending, a block of insulator material disposed between each tong means and the respective carriage means by which it is carried so as to electrically insulate said tong means from said carriage means, whereby electrical arcing from said electrode means to said tong means is substantially avoided.

5. Apparatus as in claim 4, wherein said block has a minimum length of 1 inch (2.5 centimeters).

6. Apparatus as in claim 5, wherein said block has a minimum length of 6 centimeters.

* * * * *